(12) United States Patent
Patidar

(10) Patent No.: US 12,509,127 B2
(45) Date of Patent: Dec. 30, 2025

(54) TRANSPORTATION SYSTEM

(71) Applicant: KARGETU PRIVATE LIMITED, Maharashtra (IN)

(72) Inventor: Narendra Patidar, Mandsaur (IN)

(73) Assignee: KARGETU PRIVATE LIMITED (IN)

( * ) Notice: Subject to any disclaimer, the term of this patent is extended or adjusted under 35 U.S.C. 154(b) by 729 days.

(21) Appl. No.: 17/797,967

(22) PCT Filed: Feb. 5, 2021

(86) PCT No.: PCT/IB2021/050940
§ 371 (c)(1),
(2) Date: Aug. 5, 2022

(87) PCT Pub. No.: WO2021/156804
PCT Pub. Date: Aug. 12, 2021

(65) Prior Publication Data
US 2023/0040366 A1 Feb. 9, 2023

(30) Foreign Application Priority Data

Feb. 7, 2020 (IN) .............................. 202021005522

(51) Int. Cl.
*B61B 13/12* (2006.01)
*B61B 1/00* (2006.01)
(Continued)

(52) U.S. Cl.
CPC .............. *B61B 13/12* (2013.01); *B61B 1/005* (2013.01); *B61L 1/04* (2013.01); *B61L 3/08* (2013.01); *B61L 27/04* (2013.01)

(58) Field of Classification Search
CPC . B61B 1/005; B61B 13/12; B61L 1/04; B61L 3/08; B61L 27/04
See application file for complete search history.

(56) References Cited

U.S. PATENT DOCUMENTS 3,871,303 A 3/1975 Woodling
4,413,568 A 11/1983 Huon de Kermadec
(Continued)

FOREIGN PATENT DOCUMENTS

CN 106143505 A 11/2016
CN 108622145 A 10/2018
(Continued)

OTHER PUBLICATIONS

SWE marketing intro "Skyweb Express" Taxi 2000 www.skywebexpress.com.
(Continued)

*Primary Examiner* — Robert J McCarry, Jr.

(57) ABSTRACT

A transportation system (100) based on a plurality of pods (110) without any prime movers is disclosed, having a plurality of main tracks (102) having flexible drives to engage with the pods (110) and move the pods along the main track. The pods (110) can be carried by a last-miler vehicle for providing a seamless connectivity between a starting point of a commuter and a destination location without any change. The transportation system includes stations (150) having diverter belts (104), accelerator/decelerator paths (106) and diverter patch (114), where the pods (110) can be transshipped between the main track (102) and the last-miler vehicles.

11 Claims, 7 Drawing Sheets

(51) Int. Cl.
   *B61L 1/04*      (2006.01)
   *B61L 3/08*      (2006.01)
   *B61L 27/04*     (2006.01)

(56) References Cited

U.S. PATENT DOCUMENTS

| | | | |
|---|---|---|---|
| 5,419,261 A | 5/1995 | Tarassoff et al. | |
| 5,893,329 A | 4/1999 | Klimmer | |
| 6,308,818 B1 * | 10/2001 | Bonora | B65G 37/02 198/465.1 |
| 7,284,653 B2 | 10/2007 | Fourney et al. | |
| 7,784,601 B2 | 8/2010 | Riddick et al. | |
| 8,474,596 B2 | 7/2013 | Wolkerstorfer et al. | |
| 8,887,900 B2 | 11/2014 | Wheeler | |
| 2011/0022221 A1 | 1/2011 | Fourney | |
| 2013/0199893 A1 | 8/2013 | Robbin | |

FOREIGN PATENT DOCUMENTS

| | | |
|---|---|---|
| DE | 20006726 U1 | 11/2000 |
| EP | 2361814 A2 | 10/2013 |
| EP | 2613997 B1 | 3/2018 |
| FR | 2670734 A1 | 6/1992 |
| FR | 2807723 A3 | 10/2001 |
| FR | 3049547 B1 | 7/2019 |
| GB | 1455817 A | 11/1976 |
| JP | 2006254661 A | 9/2006 |
| JP | 2019127335 A | 8/2019 |
| KR | 101704144 B1 | 2/2017 |
| WO | 2017174933 A2 | 10/2017 |
| WO | 2018021828 A1 | 2/2018 |

OTHER PUBLICATIONS

Jörgen Gustafsson, "Vectus PRT Concept and Test Track Experience", Vectus—Intelligent Transport, pp. 1-11.

* cited by examiner

TRANSPORTATION SYSTEM

TECHNICAL FIELD

The present disclosure relates to the technical field of transportation. In particular it pertains to a public transportation system that enables door to door travel of users without having to change vehicles.

BACKGROUND

The background information herein below relates to the present disclosure but is not necessarily prior art. The time spent by an average person daily in the urban traffic is 1-1.5 hours. The ratio of weight of vehicles for public transportation like buses and trains to the weight of the passengers is significantly large. This contributes to wastage of energy due to the dead weight of the vehicle. In case of a metro or a train, the commuter often needs to change a vehicle between the starting point/destination and the station of the metro/train. Typically, the average speed of travel is very low due to traffic congestion during peak hours. Multiple mandatory stops of metro/trains at intermediate stations along the lines further increase the duration of the journey.

The required infrastructure for conventional modes of transport is required to be strong and durable. To solve the problem of traffic congestion, overbridges, elevated and/or underground metro lines have been constructed. Overbridges on roadways are required to bear heavy loads. Also, overbridges are costly and often complex for construction, due to scarcity of available space. As the economy develops, the needs of the individual evolve. The average individual requires privacy, loathes changing of vehicles (e.g., change of trains from one line to another), prefers a non-stop journey, seeks door-to-door availability of transportation and also demands enhanced safety. At the same time, a transport system is more acceptable for the masses if it is more economical.

While automated or driverless cars as well as PRT (Personal Rapid Transit) is one of the most trending research and development areas, the technology shall take some time to mature and therefore, such vehicles are unlikely to be available in the near future. Another problem with automated PRT systems is related to dynamic automatic control that requires a headway which reduces system capacity. Ropeway, cable car related transportation system have capacity and speed issue. Hyperloop, the 'fifth mode of transport' has been designed to have a tremendous speed of travel. The number and the frequency of halts required in intracity makes Hyperloop not viable for intracity transport, due to high energy requirements for frequent acceleration and deceleration.

There is, therefore, felt a need of a transportation system that alleviates the problems associated with the prior art.

OBJECTS OF THE INVENTION

An objective of the present invention is to provide a transportation system that provides a door-to-door service;

Another objective of the present invention is to provide a high capacity transportation system that is fast, compact, energy efficient, reliable, secure and safe.

SUMMARY

Aspects of the present disclosure relate to a transportation system that is based on a plurality of pods without any prime movers and configured to be moved by a main track having flexible drives to engage with the pods and move the pods along the main track. The pods can further be carried by a last-miler vehicle for providing a seamless connectivity between a starting point of a commuter and a destination location without any change from one transport means to other transport means. The transportation system includes transshipment stations having diverter belts, accelerator/decelerator track and last-miler loading-unloading zone to transship the pods between the track and the last-miler vehicle.

In an aspect, the disclosed transportation system includes a plurality of main tracks, each of the main tracks having a plurality of endless flexible drives arranged along length of the main track, each of the plurality of endless flexible drives having a plurality of engaging means on an upper surface of the plurality of endless flexible drives. The system further includes a plurality of pods which are configured to get engaged to the engaging means of the flexible drives to be propelled along the length of the main track.

In an aspect, the engaging means are a friction material provided on the upper surface of the flexible drives. The plurality of pods include a longitudinally oriented channel located on a bottom surface of the pods, which channel is sized such that the corresponding flexible drive gets engaged with the channel to generate a frictional force between the channel and the friction material to act as traction force to move the pod along with the flexible drive.

In an embodiment, the transportation system can further include at least one diverter belt to direct the pods from a station to a corresponding main track, or divert the pods from the main track to the station; and at least one acceleration/deceleration path to accelerate the pods from the station and deliver the accelerated pods to the diverter belt at a speed synchronized with speed of the diverter belt, or decelerate the pods received from the diverter belt as the pods reach the station.

In an embodiment, the transportation system can further include at least one last-miler vehicle configured to carry at least one of the plurality of pods and move along with the pod from a starting point of a commuter or to a destination location of the commuter, and at least one diverter patch located at the station to transfer the pods between the at least one last-miler vehicle and the at least one acceleration/deceleration path.

In an embodiment, the transportation system can include a control system having control units to control each of the main tracks, the at least one diverter belts, the at least one acceleration/deceleration paths, the last-miler loading-unloading patches based on signals from sensors configured with each of the plurality of pods, to move the pods from the starting points to the corresponding destination locations of the commuters.

In an embodiment, the transportation system can include a plurality of synchronizers provided between the flexible drives of the main track and between the diverter tracks and the corresponding main tracks.

In an embodiment, the main track can include at least one stationary strip located along the length of the main track parallel to the plurality of flexible drives. In addition, the pods can have wheels configured to rest on the at least one stationary strip and bear at least a part of weight of the pod.

In an embodiment, the wheels can be configured with the pods such that a lower end of the wheels is located higher than the bottom surface of the pod to allow the bottom surface of the pods to be supported on the at least one diverter belt and the at least one diverter patch.

In an embodiment, the acceleration/deceleration path can have a series of wheels configured to engage with the channel of the pods. The wheels can rotate at progressively increasing speed when the acceleration/deceleration path is used as an acceleration path or at progressively reducing speed when the acceleration/deceleration path is used as a deceleration path. Each of the wheels can be coupled to the adjacent wheel by a gearing or belt mechanism that increases or reduces the speed of the adjacent wheel.

In an embodiment, each of the diverter patch and a carrier area on the at least one last-miler vehicle can have an array of moving axis rollers. Axis of rotation of the moving axis rollers can be rotatable to orient the moving axis rollers for achieving a required direction of movement of the pods during loading and unloading of the pods from the last-miler vehicle.

In an embodiment, the diverter belt can include an endless conveyor moving along a direction generally aligned with the length of the main track, and a plurality of rollers provided on the endless conveyor. At least some of the rollers are configured to selectively rotate along an axis perpendicular to direction of movement of the endless conveyor to move the pods in a direction transverse to the direction of movement of the endless conveyor.

In an embodiment, the plurality of rollers can be rotated by a dedicated motor, and the motors of the rollers can be operatively coupled to the control system. The control system can be configured to, based on the signal from a pod out of the plurality of pods, identify the rollers under the pod and selectively actuate the corresponding motors to move the pod in transverse direction to merge the pod with the main track or divert the pod from the main track, or allow the pod to proceed in the direction of movement of the main track by not actuating the corresponding motors.

In an embodiment, the at least some of the plurality of rollers can be moving axis rollers, such that axis of rotation of the moving axis rollers can be selectively rotated to orient the moving axis rollers for achieving a required direction of movement of the pods.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
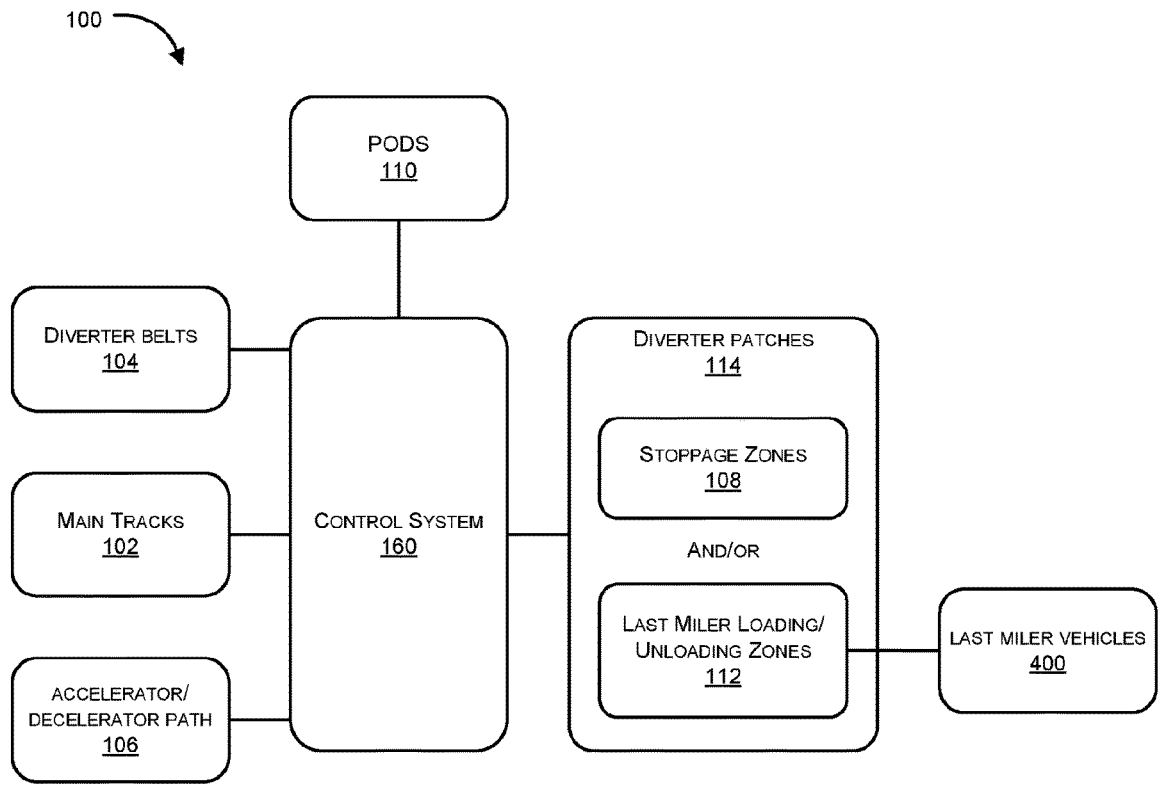
FIG. 1A illustrates an exemplary system diagram of the disclosed transportation system, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate to a transportation system that is based on a plurality of pods without any prime movers and configured to be moved by a main track having flexible drives to engage with the pods and move the pods along the main track. The pods can further be carried by a last-miler vehicle for providing a seamless connectivity between a starting point of a commuter and a destination location without any change. The transportation system includes transshipment stations having diverter belts, accelerator/decelerator track and last-miler loading-unloading zone to transship the pods between the track and the last-miler vehicle.

Referring now to FIGS. 1A to 7B, where different aspects of the disclosed transportation system are disclosed, the transportation system 100 includes a plurality of main tracks 102 (also referred to as moving tracks or simply as track, and all these terms used interchangeably herein after), having a plurality of endless flexible drives 302 (refer to FIG. 3A) arranged along length of the main track 102; a plurality of pods 110 configured to get engaged to the flexible drives 302 for being propelled and moved along the length of the main track 102. Thus, the pods 110 are characterized by absence of any prime mover, such as an IC engine or a motor, to move along the main track 102, which main track 102 provides the requisite traction force to the pods 110 through the flexible drives 302.

In an aspect, the engaging means of the flexible drives can be a friction material 304 (refer to FIG. 3A) provided on outer facing surfaces of the flexible drives 302. The pods 110 can include a longitudinally oriented channel 206 (refer to FIGS. 2A and 2B) located on a bottom surface of the pods 110. The channel 206 can be sized such that the corresponding flexible drive 302 can get engaged with the channel 206 to generate a frictional force between the channel 206 and the friction material 304 to act as traction force to move the pod 110 along with the flexible drive 302.

The transportation system 100 can also include at least one diverter belt 104 to merge or divert the pods 110 from the main track 102, and at least one acceleration/deceleration path 106 to accelerate the pods 110 and deliver the accelerated pods to the diverter belt 104 at a speed synchronized with the speed of the diverter belt 104, or to decelerate the pods 110 received from the diverter belt 104. In an aspect, the diverter belt 104 and the acceleration/deceleration path 106 are also configured to move the pods 110 in desired directions without any traction effort by the pods 110 themselves.

Figure 1B:
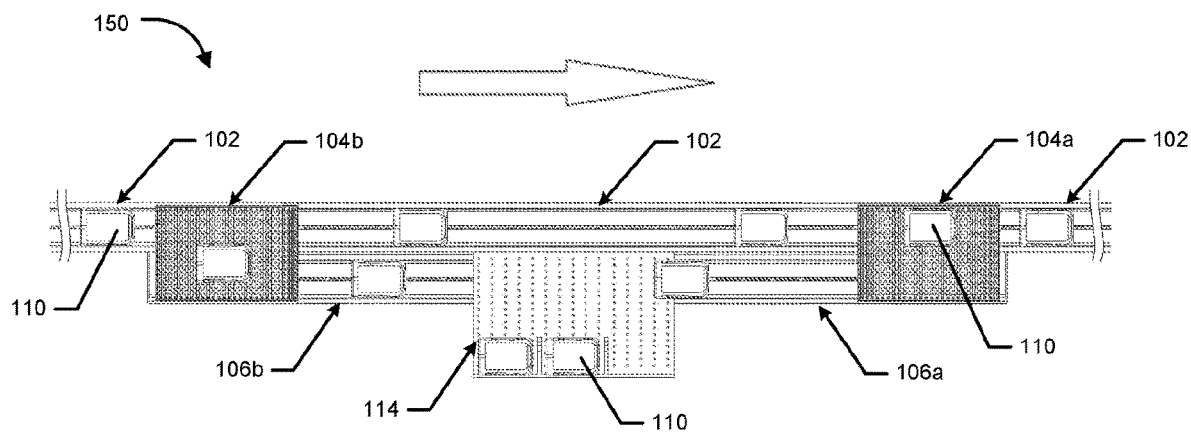
FIG. 1B illustrates a schematic view of a station of the disclosed transportation system, in accordance with embodiments of the present disclosure.

In an embodiment, as shown in FIG. 1B, the diverter belt 104 can be configured for functionality of a splitter belt 104b (also referred to splitter siding and the two terms used interchangeably hereinafter) or merger belt 104a (also referred to merger siding and the two terms used interchangeably hereinafter) by configuring the diverter belt 104 appropriately without any major change in its mechanical configuration. Similarly, the acceleration/deceleration path 106 can be configured for functionality of an accelerator track 106a (also referred to as acceleration path and the two terms used interchangeably hereinafter) or a decelerator track 106b (also referred to as deceleration path and the two terms used interchangeably hereinafter) without any major change in its mechanical configuration.

In an embodiment, the transportation system 100 can further include means to provide last mile connectivity to its users from a starting point of a commuter (also referred to as originating/source location and the terms used interchangeably hereinafter), to a destination location of the commuter (also referred to as destination point and the terms used interchangeably hereinafter). The means include at least one last-miler connectivity vehicle 400 (refer to FIGS. 4A and 4B capable of carrying one or more pods 110 to transport users (also referred to as commuters) of the transportation system 100 between a station 150 (Refer to FIG. 5) and a destination location or a starting point. In an aspect, the users are not required to disembark from the last-miler vehicle 400 to board the pod 110, or vice versa, and instead, the last-miler vehicle 400 is configured to carry the pod 110 itself with the user seated therein. Thus the proposed transportation system 100 provides a means for seamless travelling to commuters between the starting point and the destination location thereby providing door to door connectivity.

In an embodiment shown in FIG. 1B, where a configuration of a station 150 of the proposed transportation system is disclosed, a plurality of stations, such as station 150 can be provided at on a network of the tracks 102 at predefined locations. The stations 150 can be configured to provide functionality of any or a combination of: receiving the incoming pods 110 from the respective starting points of the commuters, discharging the pods 110 from the main track 102 for onward journey to the respective destination locations of the users, and allowing commuters to disembark from the pods at the station 150 itself without using the service of the last-miler vehicle 400.

As shown in FIG. 1B, the stations 150 can include main tracks 102 configured bring the pods 110 from other locations to the station 150 and to carry away the pods 110 from the station 150 to other locations. The stations 150 can be configured to allow a pod 110 after the corresponding commuter has disembarked, or an incoming pod received by a last-miler vehicle 400, to merge into the flow of the pods on the track 102, as well as allow a pod 110 to sort out of the flow of pods 110 on the track 102 for disembarking commuters or for being loaded on a last-miler vehicle 400. For this, the stations 150 can include the accelerator path 106a for accelerating a pod 110 that needs to be merged with the flow of pods on the track 102, and a decelerator path 106b for decelerating the pods 110 that are coming to the station 150 from other locations. The station further includes the diverter belts 104, such as merger belt 104a positioned between the accelerator path 106a and main track 102, and splitter belt 104b positioned between the decelerator track 106b and the main track 102.

As shown in FIG. 1B, the stations 150 of the transportation station 100 can include a stoppage zone for pods 110 located between the accelerator path 106a and the decelerator path 106b, which can be used for parking of the arriving pods and departing pods. The stoppage zone can be at least one diverter patch 114 configured along with the diverter belts 104 and acceleration/deceleration paths 106 in an appropriate manner to enable positioning of the pods 110 at respective desired locations at the station 150, for which the diverter patches 114 have functionality of moving the individual pods 110 in any desired direction, as would be described in subsequent paragraphs.

In an embodiment, Referring to FIG. 1A, the transportation system 100 can further include a control system 160 having a centralized control and individual control units to control each of the main tracks 102, the diverter belts 104, the acceleration/deceleration paths 106, the diverter patches 114 based on signals from sensors configured with each of the pods 110. The centralized control of the control system 160, by controlling each of the aggregates/components, can enable movement of the pods 110 from the starting points of the respective commuters to the corresponding destination locations by appropriately actuating the corresponding diverter belts 104, the acceleration/deceleration paths 106, the diverter patches 114. In an embodiment, the central control can be embodied in a server, and can function to start, stop, apply emergency brakes etc. In another embodiment, the individual control units to control the aggregates/components can be located in the aggregates/components themselves.

In an embodiment, the control system 160 of the disclosed transport system 100 can include, besides the centralized control, a local control system that can work based on a direct communication between the pods 110, by way of signals from the pods 110, and the other aggregates/components, such as the main track 102, the diverter belts 104, the acceleration/deceleration paths 106, the diverter patches 114. Based on the signals, the control units of each of the main tracks 102, the diverter belts 104, the acceleration/deceleration paths 106, the diverter patches 114 can take action to move the pods 110 along a desired route leading to the respective destinations.

In an embodiment, the network of the main tracks 102 can include zones having different speeds of the tracks 102. In an embodiment, a first zone can have a speed of 30 km/hr, a second zone can have a speed of 60 km/hr, a third zone can have a speed of 90 km/hr and a fourth zone can have a speed of 120 km/hr.

Figure 2A:
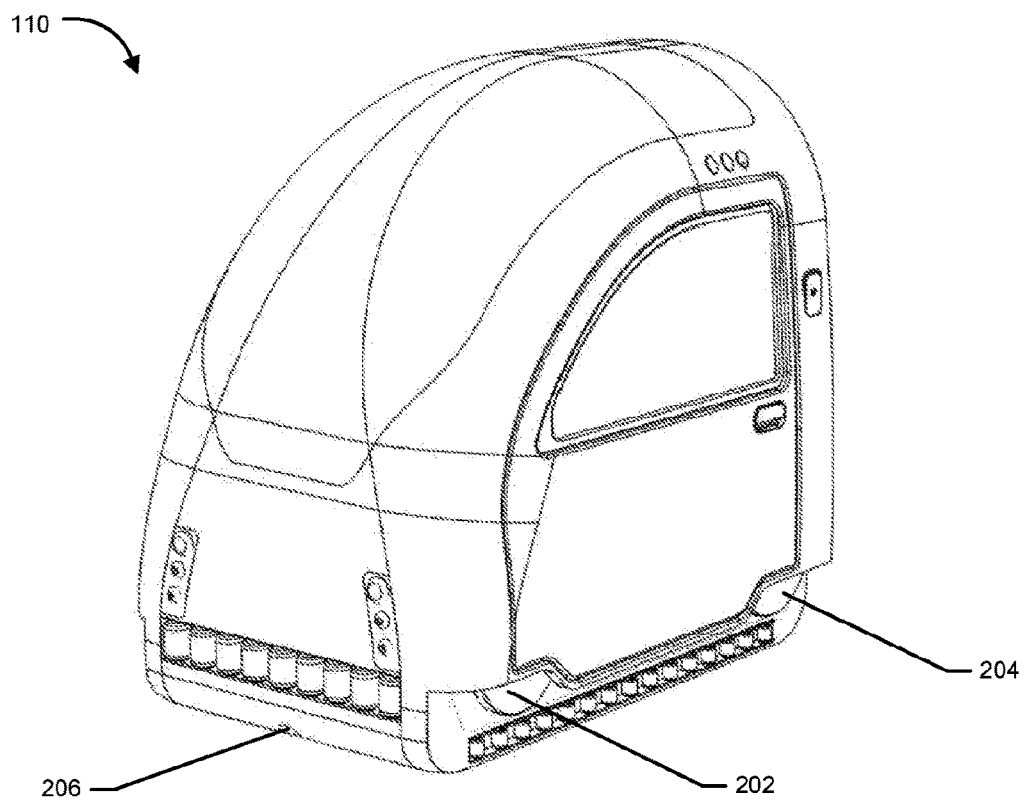
FIG. 2A illustrates an exemplary perspective view of a pod, in accordance with embodiments of the present disclosure.
Figure 2B:
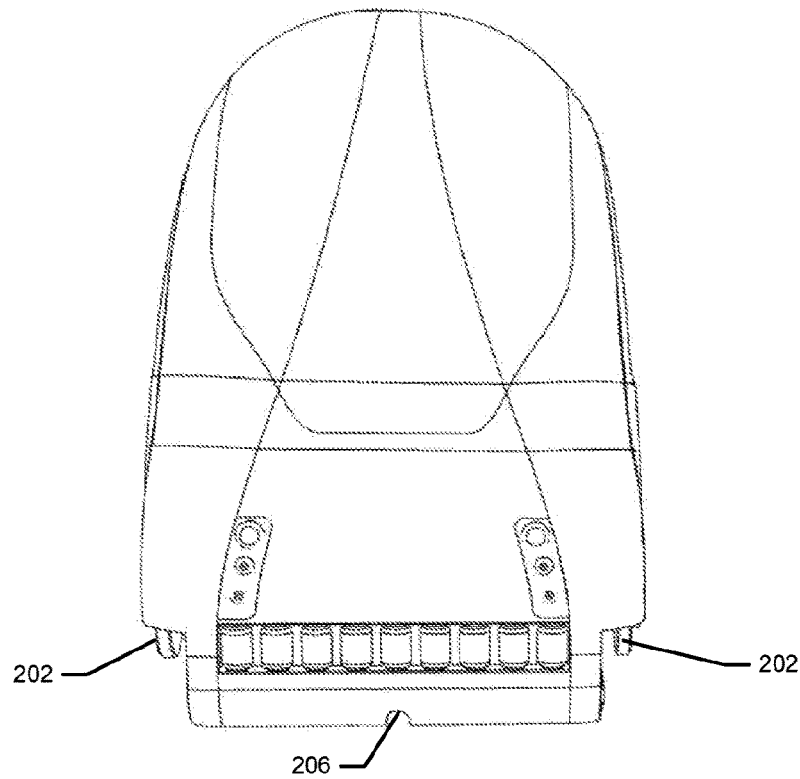
FIG. 2B illustrates an exemplary front view of the pod, in accordance with embodiments of the present disclosure.

FIGS. 2A and 2B illustrate a perspective view and a front view of the pod 110. The pod 110 is a non-propelled, passive light-weight cabin to accommodate one or more users. The pod 110 is configured to support weight of one or two average fully grown individuals and their belongings, while minimizing the weight of the cabin. The pod 110 is adapted to be stable against the various forces exerted thereon, especially during acceleration, deceleration, loading, lateral displacement and so on. The pod 110 can also include one or more channels 206 located on bottom side that can engage with the flexible drive 302 of the track 102 for being propelled along the track 102. A special device can be mounted in the pods 110 to provide a unique identity to each of the pods 110 and identify its location on the transportation system 100, which identity and the location can be used by the control system 160, or the control units of different aggregates/components, to control other aggregates/components on the transportation system 100 to move the pods 110 between the respective starting points and the corresponding destination locations. The device can also receive and store passenger's destination information via a scanner system (selected from a group consisting of QR code, smart card etc.). The device can also have the capability to transmit destination information, through the control system 160 or directly, to other aggregates/components like the last-miler vehicle 400, the diverter patches 114 in the stoppage zones, the accelerator/decelerator paths 106, the diverter belts 104 and the main track 102.

In an embodiment, the pod 110 can be configured to receive electricity from the tracks 102 and stations 150 that the pod 110 would be moving on or supported on, which include the diverter belts 104, the diverter patch 114, the accelerator/decelerator paths 106 and the last-miler vehicles 400. The pod 110 can also be provided with a battery that can be charged by received electric power as stated above, and can be utilized for further supplying power to centralized audio-visual information and alerting devices installed within the pod 110, the occupant's personal devices, ventilation fans and so on.

In an embodiment, the pod 110 can be made available in variants like ambulance pod, cargo pod, cargo as well as passenger carriage configuration. Moreover, the front wheels 202 and the rear wheels 204 of the pod 110 can be provided with shock-absorbing suspensions for facilitating a smooth transition between the splitter siding 104b/the merger siding 104a and the main track 102.

Figure 3A:
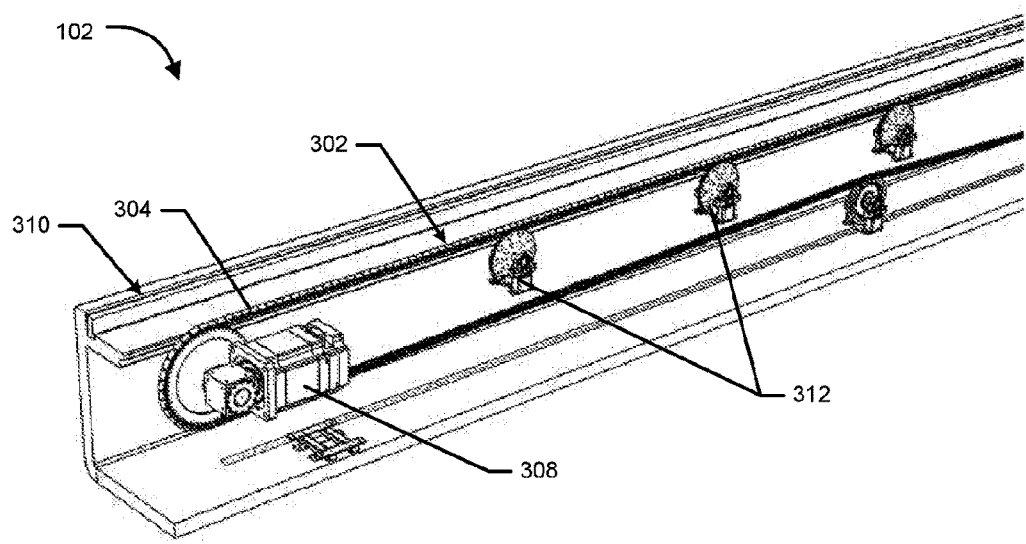
FIG. 3A illustrates an exemplary perspective cut view of the main track, in accordance with embodiments of the present disclosure.

FIG. 3A shows a perspective cut view of the main track 102 showing propulsion mechanism of the main track 102. The propulsion mechanism includes a plurality of flexible drives 302 laid along length of the track 102. Each flexible drive 302 can be based on an endless flexible element comprising connected links, such as in a chain, to provide a desired flexibility. The flexible drive 302 can include a plurality of engaging means along the length of the flexible drive 302. In an aspect, the engaging means can be a friction material 304 provided on outer facing surfaces of the links of the flexible drive 302. The friction material 304 can be shaped such that they engage with the channel 206 at the bottom surface of the pods 110 to generate a frictional force between the channel 206 and the friction material 304 to act as traction force to move the pod along with the flexible drive 302.

Figure 3B:
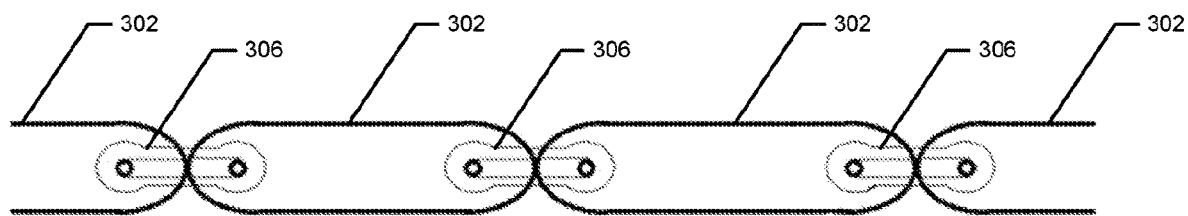
FIG. 3B illustrates an exemplary arrangement of a plurality of flexible drives of the main track of FIG. 3A, in accordance with embodiments of the present disclosure.

The flexible drive 302 can be wrapped around a plurality of idler rollers 312, and can be driven by a motor 308 through at least one roller coupled to the motor 308, as shown in FIG. 3A. Further, on the slack side of the flexible drive 302, at least one tensioner slotted roller can be provided. The main track 102 can further have at least one stationary strip 310 located on any one or both sides of the flexible drives 302 running parallel thereto. A synchronizer mechanism 306, as shown in FIG. 3B, can be provided between driving means of the adjacent flexible drives 302 to ensure that they move at same linear speed for a jerk free transition of the pods 110 from one flexible drive 302 to the next flexible drive 302. The synchronizer mechanism 306 can also act to compensate any deviation in speed of a flexible element drive due to change in loading conditions. In an embodiment, the synchronizer can include a clutch mechanism which is capable to receive actuate command from control unit of any of the aggregates/component, or from the control system 160 to selectively allow the adjacent flexible drives 302 to move at different speeds or same speed. In another embodiment, the functionality of synchronizer can be achieved digitally by monitoring RPM of respective flexible drives 302 and controlling speed of the associated motors 308.

In an embodiment, the wheels 202, 204 of the pods 110 and the at least one stationary strip 310 of the track 102 can be configured such that at a lowest point of each of the wheels 202, 204 and the at least one stationary strip 310 are located higher than the bottom surface of the pods 110. This allows the bottom surface of the pods 110 to make contact with other aggregates of the transport system 100, i.e. the diverter patches 114 with the diverter belts 104 without the wheels 202 and 204 interfering with the respective aggregates, but allowing the wheels 202, 204 to roll on the stationary strip 310 when the pod 110 is moving along the main tracks 102. In another embodiment, the wheels 202 and 204 can be configured with the pods 110 such that the stationary strip 310 bears only partial load of the pod 110 through the wheels 202 and 204, with remaining weight being borne by the flexible drives 302, which is enough for providing enough frictional force for traction of the pods 110. Therefore, the overall rated load of the motors driving the moving track 102 and the required capacity, and thereby, the weight of the moving elements is reduced.

Figure 3C:
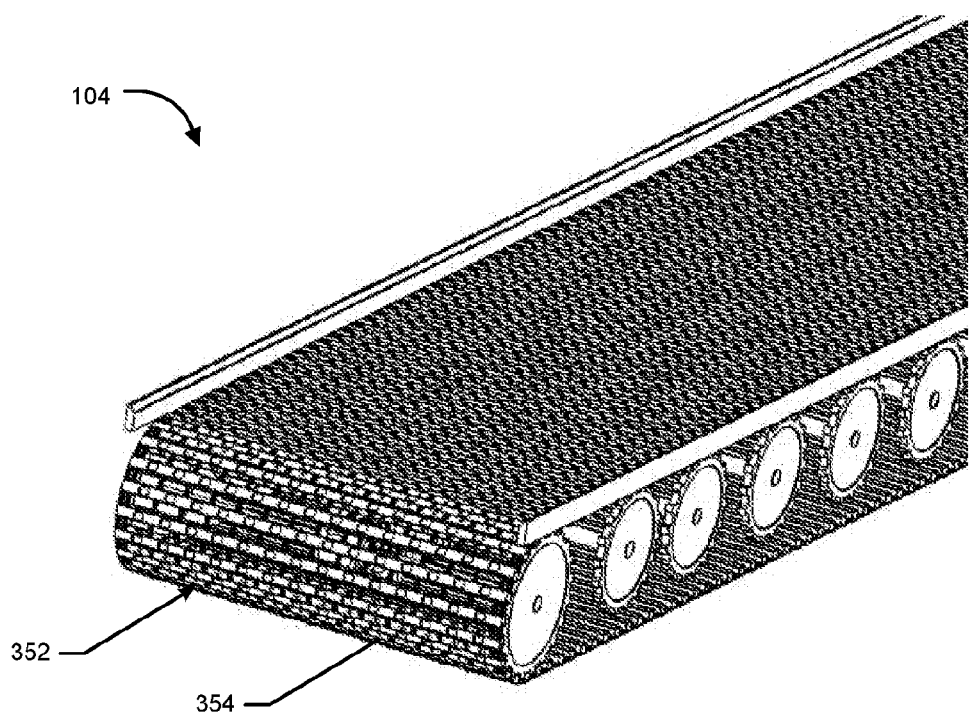
FIG. 3C illustrates an exemplary perspective view of the diverter belt, in accordance with embodiments of the present disclosure.

FIG. 3C shows a perspective view of the diverter belt 104 having a moving endless conveyor 352 having an array of a plurality of rollers 354. Each of the plurality of rollers 354 can be configured to rotate along an axis aligned with direction of movement of the endless conveyor 354 to move the pods 110 in a direction transverse to the direction of movement of the endless conveyor 352. In an alternate embodiment, each of the plurality of rollers 354 can be a rotating axis roller, such that rotating axis of the roller can be rotated about a vertical axis to orient the axis of rotation in different directions, including a direction that is aligned with the direction of movement of the conveyor 352 so that the roller 354 can enable movement of the pods 110 resting thereon in a direction transverse to the direction of movement of the endless conveyor 352. The movable axis configuration of the rollers 354 can enable the axis of rotation of the rollers 354 to be oriented perpendicular to the direction of movement of the conveyor 352 and thereafter rotated in one direction or other to increase or reduce speed of the pod 110 supported thereon. In an embodiment, outer cylindrical surface of the rollers when they have the movable axis configuration can have a convex shape to enable rotation of the axis of the roller without undue friction and wear by providing a smaller contact area between the bottom surface of the pods 110 and the roller 354.

In an embodiment, the rollers 354 can be rotated by dedicated motors, and the motors of the plurality of rollers 354 can be operatively coupled to the control system 160. The control system 160 can be configured to, based on the signal from the pods 110 ascertain location of the pod 110 and identify the rollers 354 under the pod 110 and selectively actuate the corresponding motors to move the pod 110 in transverse direction to merge the pod 110 received through the accelerator track 106a with the main track 10, or divert the pod 110 received from the main track 102 to the deceleration track 106b. The rollers 354 may also be kept stationary, by not actuating the corresponding motors, to allow the pods 110 to proceed in the direction of movement of the main track 102.

In an embodiment, the dedicated motor for rotating the rollers 354 can be incorporated within the roller itself, i.e. the roller 354 can be made of motors itself to reduce weight, space consumption. For example, outer casing of the motor can be configured as a rotor of the motor and further configured to provide the functionality of cylindrical surface of the roller. Likewise, the rollers 402 (refer to FIG. 4) and the rollers 502 (Refer to FIG. 5) can also be configured with dedicated motors for commonality and reduction in variety.

In an embodiment, the rollers 354 can be rotated by dedicated motors, and the motors of the plurality of rollers 354 can be actuated based on the signal from the pods 110 as certain location of the pod 110 and identify the rollers 354 under the pod 110 and selectively actuate the corresponding motors to move the pod 110 in transverse direction to merge the pod 110 received through the accelerator track 106 with the main track 102, or divert the pod 110 received from the main track 102 to the deceleration track 106b. The rollers 354 may also be kept stationary, by not actuating the corresponding motors, to allow the pods 110 to proceed in the direction of movement of the main track 102.

In another embodiment, rollers 354 can be actuated based on signal from pods 110 only, which would make the system fast and reduce communication load on the control system 160, and work as a local control without interference from the control system 160.

In an embodiment, the diverter belt 104 can have a first set of rollers 354 that may be powered and a second set of rollers 354, i.e., the remaining rollers 354, may be non-powered rollers. The diverter belt 104 may be configured to rotate at the same speed as that of the main track 102, such as by providing a synchronizer, such as the synchronizer mechanism 306.

In yet another embodiment, the diverter belt 104 can have a shoe-sorter mechanism instead of the rollers 354.

Figure 3D:
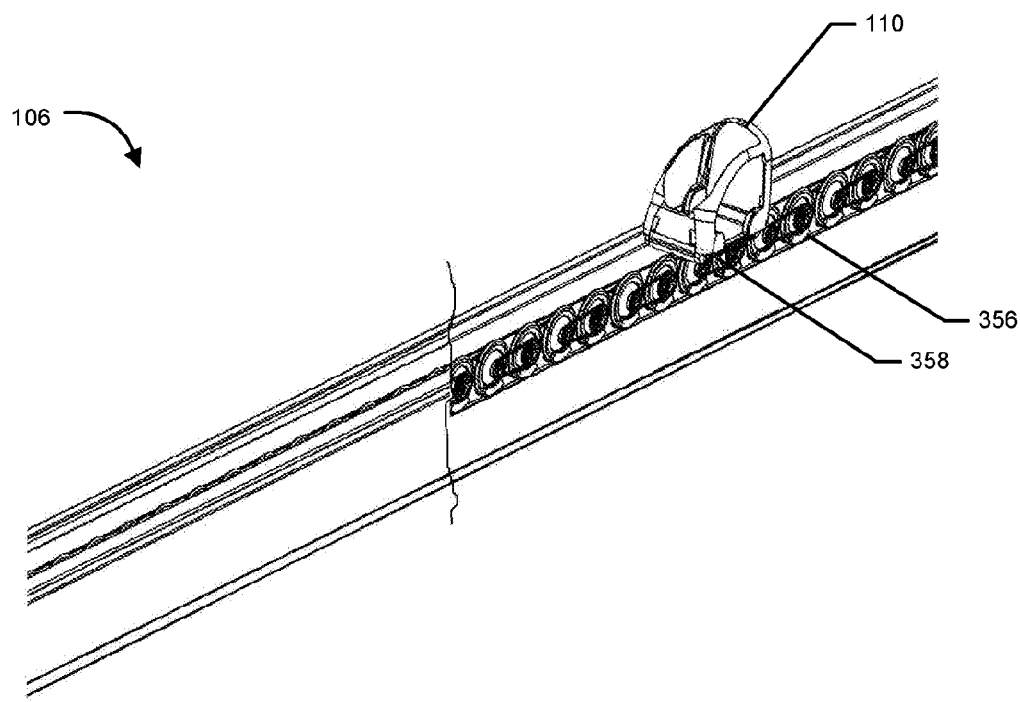
FIG. 3D illustrates an exemplary perspective cut view of an accelerator/decelerator track, in accordance with embodiments of the present disclosure.

Referring to FIG. 3D, the accelerator/decelerator path 106 is configured to raise or reduce the speed of the pods 110 from zero to a predetermined speed, or vice-versa, the predetermined speed being equal to the speed of the main track 102. In another embodiment, an accelerator path 106a is configured to raise the speed of a pod 110 from a first predetermined speed to a second predetermined, and a decelerator path 106b is configured to bring the speed of a pod 110 from the second predetermined to the first predetermined speed. In an embodiment, the accelerator/decelerator paths 106 include a series of wheels 356 rotating at progressively increasing or reducing speeds, depending on application as an accelerator path 106a or a decelerator path 106b. Each of the series of wheels 356 can be coupled to the adjacent wheel 356 by a gearing or belt mechanism 358 that reduces or increases the speed of the adjacent wheel 356. The accelerator/decelerator paths 106 can include drive motors. The wheels 356 can be configured to engage with the channel 206 of the pods 110 to enable force transfer between the pods 110 and the accelerator/decelerator path 106 during acceleration or deceleration of the pods 110. In an embodiment, the wheels 356 can include a friction material provided on outer facing surfaces of the wheels 356, and can be shaped such that they engage with the channel 206 at the bottom surface of the pods 110 to generate the frictional force. In another embodiment, the accelerator/decelerator path 106 can also include at least one stationary strip similar to the stationary strip 310, located on any one or both sides of the series of wheels 356 running parallel thereto, and the wheels 202 and 204 of the pods 110 can rest on the stationary strip to partially support the pods 110.

In an embodiment, the decelerator path 106b can be a regenerative decelerator which can recover the kinetic energy from the pods 110 and store the same for later use.

Figure 4A:
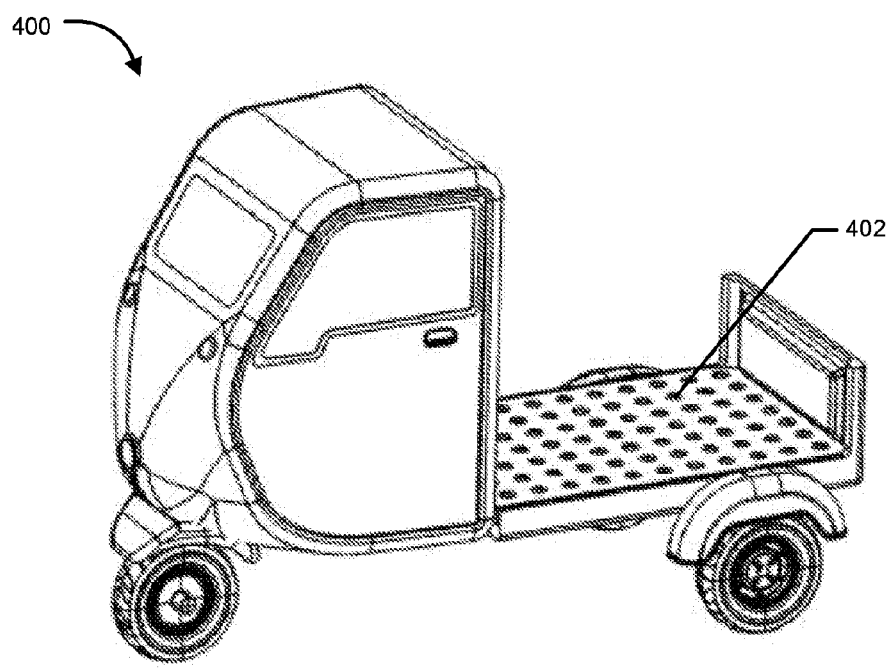
FIGS. 4A and 4B illustrate exemplary perspective views of a last-miler vehicle respectively without a pod and with a pod, in accordance with embodiments of the present disclosure.
Figure 4B:
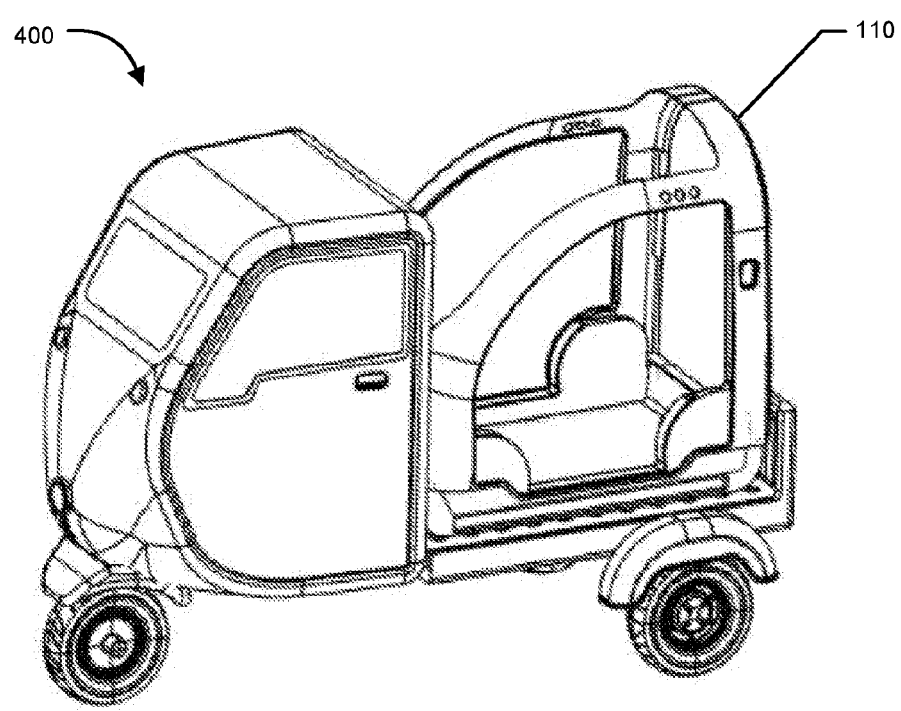

A last-miler vehicle 400 of the present disclosure, as illustrated in FIGS. 4A and 4B can be a human-driven vehicle that is configured to transport one or more of the plurality of pods 110 along with commuters from their starting point to the station 150 for merging with the flow of pods 110 on the main track 102 through the diverter patch 114, or to carry the pods 110 from the stations 150, after they have been sorted and received from the main track 102, to a destination location. A carrier area on the last-miler vehicle 400 can incorporate an array of a plurality of movable axis rollers 402 to enable movement of the pod 110 in any direction, such as a direction transverse to a longitudinal direction of the last-miler vehicle 400 for loading and unloading of the pods 110 from a side of the last-miler vehicle 400, or a direction parallel to the longitudinal direction of the last-miler vehicle 400 for loading and unloading of the pods 110 from a rear side of the last-miler vehicle 400. It is to be understood that rollers 402, rollers 354 and the rollers 502 (Refer to FIG. 5) can be identical for commonality and reduction in variety.

In an embodiment, a driver can be assigned to each last-miler vehicle 400. In another embodiment, the last-miler vehicle 400 can be an autonomous vehicle configured to move in a autopilot mode that is enabled using artificial intelligence. The last-miler vehicle 400 may have a pre-defined speed limit, e.g., 25 km/hr.

Figure 5:
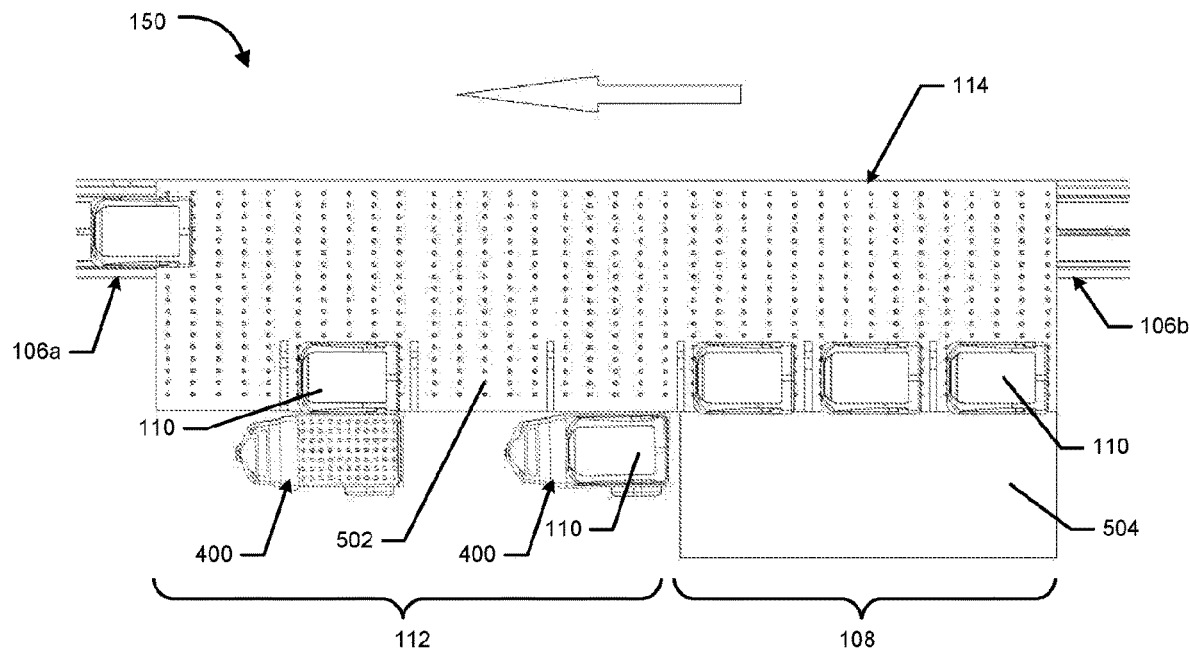
FIG. 5 illustrates an exemplary top view of the station having a last-miler loading-unloading zone and stoppage zone, in accordance with embodiments of the present disclosure.

FIG. 5 shows further details of the station 150, wherein the station 150 can have a last-miler loading-unloading zone 112 for loading and unloading last-miler vehicles 400 with the pods 110, and a stoppage zone 108 having a platform 504 to enable commuters, who do not wish to avail the last-miler vehicle 400 for last mile connectivity, to deboard or board the pods 110. The diverter patch 114 can have moving axis rollers 502 whose axes of rotation can be controlled to align them for achieving the required direction of movement of the pod 110, such as for moving the pods 110 from the decelerator path 106b towards the last-miler loading-unloading zone 112 or to the stoppage zone 108, and for moving the pods 110 from the last-miler loading-unloading zone 112 or the stoppage zone 108 towards the accelerator path 106a. Again, as in case of the rollers 354 of the diverter belt 104, each of the movable axis rollers 502 can be operatively coupled to the control system 160, or directly based on signals from the pods 110, for selective rotation of the rotational axis of the roller 502 and for rotating the rollers 502 about its axis based on identified pod 110 that rests on the rollers 502 and destination location of the identified pod 110.

Figure 6:
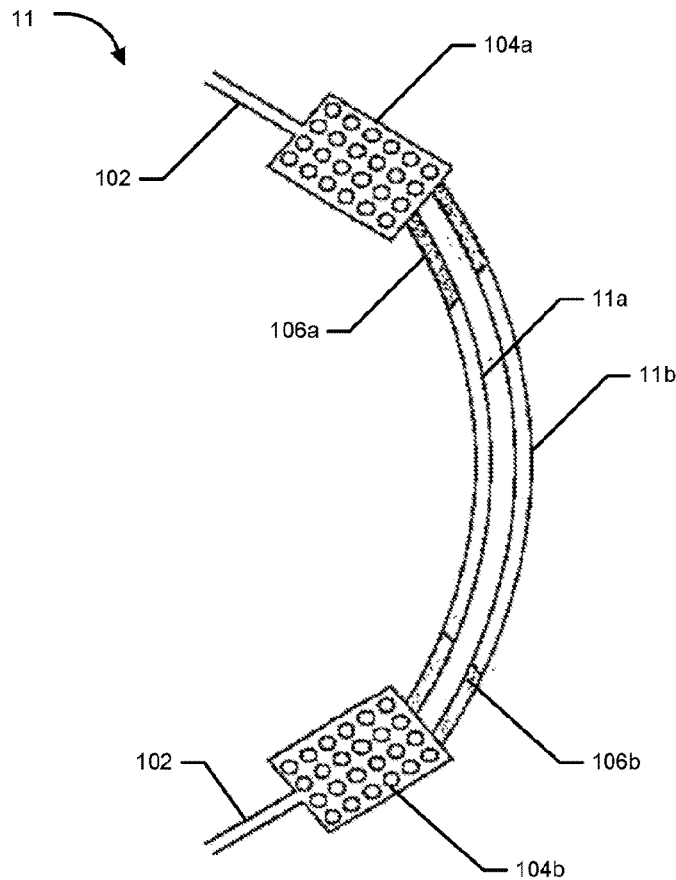
FIG. 6 illustrates an exemplary turning patch of the main track of the disclosed transportation system, in accordance with embodiments of the present disclosure.

A turning patch 11 of the moving track 102 is illustrated in FIG. 6. The turning patch 11 can include of a decelerator path 106b at the start of the curve and an accelerator path 106a at the end of the curve of the turning patch 11. In an embodiment, wherein the speed of the pods along the straight moving track 102 is 60 kmph, the decelerator path 106b is configured to decelerate the pods entering the turning patch 11, for example from 60 kmph to 30 kmph, and the accelerator path 106a can be configured to accelerate the pods 110 exiting the turning patch 11, for example from 30 kmph to 60 kmph. The turning patch 11 is further provided with at least one turning patch segment 11a. Further, in an embodiment, the turning patch 11 has a plurality of parallel turning patch segments 11a, 11b and so on, with a splitter siding 104b and a merger siding 104a at the entry and the exit of the curves respectively of the turning patch 11. By providing the plurality of turning patch segments, it is ensured that the same overall pod flow rate is ensured while the velocity of travel along the turn is reduced to provide safety during turning.

Figure 7A:
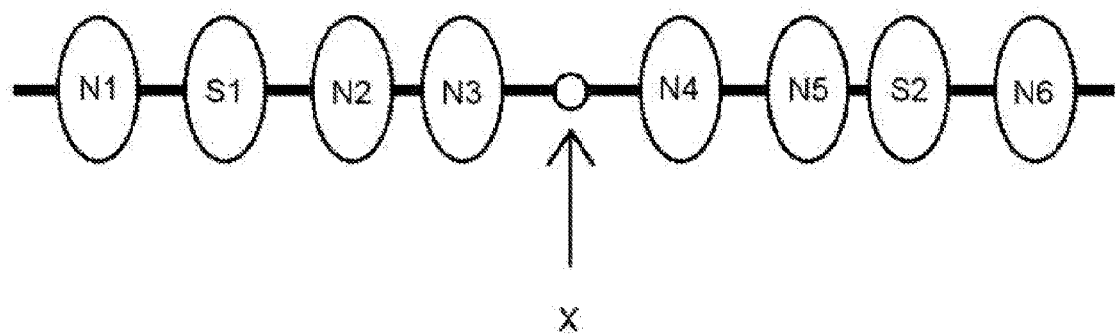
FIG. 7A illustrates an exemplary case of failure of the moving track, in accordance with embodiments of the present disclosure.
Figure 7B:
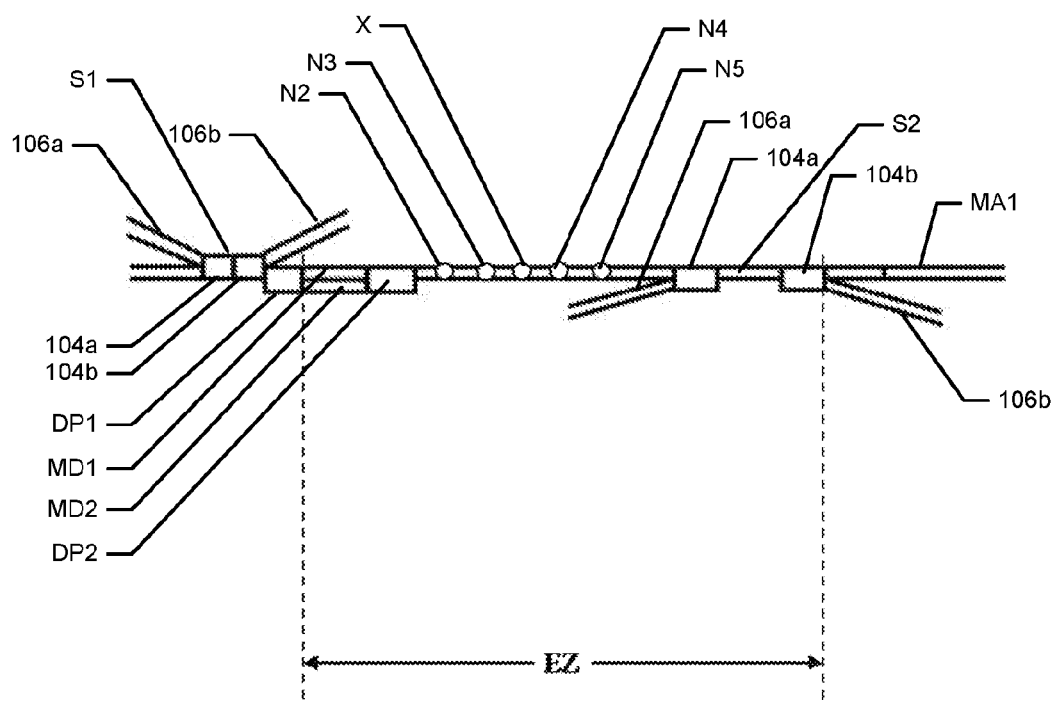
FIG. 7B illustrates an exemplary configuration of the transportation system configured for dealing with any type of failure, in accordance with embodiments of the present disclosure.

An exemplary case of any failure of the any track is illustrated with the help of FIGS. 7A and 7B, wherein stations N1, N2, N3, . . . N6 are normal stations and X is the point where an undesired accidental situation, such as a crash or a broken/failed flexible element drive, has occurred. Station S1 is an example of a special station having a higher capacity and two special main track-cum-decelerator tracks MD1, MD2 and two diverter belts DP1, DP2. Station S2 is an example of a special station with a higher capacity and one special main track cum accelerator track MAL The first main track-cum-decelerator track MD1 is configured to have a capability to act as a decelerator path (e.g., 60 km/hr to 45 km/hr) at the time of emergency and in a normal case the first main track-cum-decelerator track MD1 is configured to act as a main track. The second main track-cum-decelerator track MD2 is configured to have the capability to act as a decelerator path (e.g., 60 km/hr to 45 km/hr) at the time of an emergency and in a normal case the second main track-cum-decelerator track MD2 will act as a main track. The purpose for providing the splitting is to have predetermined gap between the arriving pods. The main track-cum-accelerator track MA1 is configured to have the capability to act as an accelerator path (e.g., 45 km/hr 25 to 60 km/hr) at the time of an emergency and in a normal case the main track-cum-accelerator track MA1 can act as a main track. The first diverter belt DP1 is configured to split the pods and the second diverter belt DP2 is configured to merge the pods.

At the station S1, in the event of an emergency, brakes are applied in the 'evacuation zone' (EZ) shown in FIG. 7B. At the moment of emergency, the pods at the splitting siding will safely enter in the 'evacuation zone' (EZ) and from the next moment, the other pods will start splitting.

At the station S2, in the event of an emergency, brakes are applied in the evacuation zone (EZ) shown in FIG. 7B. At the moment of emergency, the pods at the splitting siding will safely exit from the evacuation zone (EZ) and from the next moment, the other pods will start splitting.

Alternatively, powered rollers (not shown in Figures) can be mounted on the pod 110. The mounted powered rollers are capable to move pod 110 in any direction. These rollers can be digitally controlled. Instead of providing the merger siding 104a and the splitter siding 104b with powered rollers, plain belts with a high coefficient of friction can be provided at the merger siding 104a and the splitter siding 104b. The powered rollers of the pod 110 can move in the required direction while splitting/merging. The interchange station 150 can have plain belts so that pod 110 can perform the siding movement itself wherein the siding movement of the pod 110 can be controlled digitally while being guided using sensors. Further, the pod 110 can be shifted by using powered rollers of the pod 110 onto the last-miler vehicle 400.

In an embodiment, the centralized control of the control system 160 can be embodied in a server, and can include a monitoring system for monitoring functionality, and accordingly the centralized control is referred hereinafter as 'central control and monitoring server'. Various types of device can be installed on different aggregates/components, i.e. the main tracks 102, the diverter belts 104, the accelerator/decelerator paths 106, which can send data like real time location of pods 110, speed of the pods 110, orientation of the pods 110, component health like wear and tear or any damage, motor health, brake health, RPM information, foreign object, load conditions and so on to 'central control and monitoring server'.

In an embodiment, the data received from the devices installed on different aggregates/components can be used for detection of location of each of the pods 110, station crowd management, rerouting/management of the empty pods 110 to other stations, Last-miler booking, emergency declaration, volume of pods on various tracks and so on.

In an embodiment, the devices installed on different aggregates/components can be any or a combination of electrical devices, cameras, computers, servers, sensors or processing units. These devices are capable of transmitting and receiving data from other devices through wired or wirelessly connections at very low latency.

In an embodiment, the 'central control and monitoring server' can be configured with capability to control motors of the main track 102, the dedicated motors of the rollers of diverter belts 104, motors of the acceleration/deceleration paths 106, dedicated motors of the rollers of diverter patch 114, and to apply brakes in emergency for affected portions.

In an embodiment, the 'central control and monitoring server' can consist of computers, sensors, electrical devices, capable to control various components wirelessly or with wire.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure described herein above has several technical advantages including, but not limited to, the realization of a transportation system that provides a door-to-door service;

The present disclosure provides a high capacity transportation system that is fast, compact, energy efficient, reliable, secure and safe.

I claim:
1. A transportation system comprising:
   a plurality of main tracks, each of the plurality of main tracks comprising a plurality of endless flexible drives arranged along a length of the main track, and each of the plurality of endless flexible drives comprising a plurality of engaging means on an upper surface of the plurality of endless flexible drives;
   a plurality of pods configured to get engaged to the plurality of engaging means to be propelled along the length of the main track;
   at least one diverter belt configured at an end of the main track to direct the pods from a station to the main track, or divert the pods from the main track to the station, wherein the main track comprises at least one station- ary strip located along the length of the main track parallel to the plurality of endless flexible drives, and wherein the pods comprise wheels configured to rest on the at least one stationary strip and bear at least a part of weight of the pods, wherein the engaging means is a friction material provided on the upper surface of each of the plurality of endless flexible drives, and each of the plurality of pods includes a longitudinally oriented channel located on a bottom surface of respective pods, the channel being sized such that the corresponding flexible drive gets engaged with the channel and a frictional force between the channel and the friction material provides a traction force to move the pod along with the flexible drive.

2. The transportation system of claim 1, wherein the transportation system further comprises:
   at least one acceleration/deceleration path to accelerate the pods from the station and deliver the accelerated pods to the at least one diverter belt at a speed synchronized with a speed of the at least one diverter belt, or decelerate the pods received from the at least one diverter belt as the pods reach the station;
   at least one last-miler vehicle configured to carry at least one of the plurality of pods and move along with the at least one pod from a starting point of a commuter or to a destination location of the commuter; and
   at least one diverter patch located at the station to transfer the at least one pod between the at least one last-miler vehicle and the at least one acceleration/deceleration path.

3. The transportation system of claim 2, wherein the transportation system further comprises a control system comprising control units to control each of the plurality of main tracks, the at least one diverter belt, the at least one acceleration/deceleration path, the at least one diverter patch based on signals from sensors configured with each of the plurality of pods, to move the respective pod from starting points to corresponding destination locations of commuters.

4. The transportation system of claim 2, wherein the at least one acceleration/deceleration path comprises a series of wheels configured to engage with the channel of the pods, the series of wheels rotating at progressively increasing speed when the at least one acceleration/deceleration path is used as an acceleration path or at progressively reducing speed when the at least one acceleration/deceleration path is used as a deceleration path, and wherein each of the series of wheels is coupled to the adjacent wheel by a gearing or belt mechanism that increases or reduces the speed of the adjacent wheel.

5. The transportation system of claim 2, wherein each of the at least one diverter patch and a carrier area on the at least one last-miler vehicle incorporates an array of moving axis rollers, wherein axis of rotation of the moving axis rollers is rotatable to orient the moving axis rollers for achieving a required direction of movement of the pods during loading and unloading of the pods from the at least one last-miler vehicle.

6. The transportation system of claim 1, wherein the transportation system further comprises a plurality of synchronizers provided between the plurality of endless flexible drives of the main track and between the at least one diverter belt and the corresponding main tracks.

7. The transportation system of claim 1, wherein the wheels are configured with the respective pod such that a lower end of the wheels is located higher than the bottom surface of the respective pod to allow the bottom surface of the respective pod to be supported on the at least one diverter belt and the at least one diverter patch.

8. The transportation system of claim 1, further comprising:
   at least one acceleration/deceleration path to accelerate the pods from the station and deliver the accelerated pods to the at least one diverter belt at a speed synchronized with a speed of the at least one diverter belt, or decelerate the pods received from the at least one diverter belt as the pods reach the station; and
   a control system comprising control units to control each of the plurality of main tracks, the at least one diverter belt, and the at least one acceleration/deceleration path based on signals from sensors configured with each of the plurality of pods, to move the respective pod from the station to the main track or from the main track to the station, wherein the at least one diverter belt comprises an endless conveyor moving along a direction aligned with the length of the main track, and a plurality of rollers provided on the endless conveyor, wherein at least some of the plurality of rollers is configured to selectively rotate along an axis perpendicular to the direction of movement of the endless conveyor to move at least one pod in a direction transverse to the direction of movement of the endless conveyor.

9. The transportation system of claim 8, wherein each of the plurality of rollers is rotated by a dedicated motor, wherein the motors of the plurality of rollers are operatively coupled to the control system, and wherein the control system is configured to, based on a signal from a pod out of the plurality of pods, identify the rollers under the pod and selectively actuate the corresponding motors to move the pod in transverse direction to merge the pod with the main track or divert the pod from the main track, or allow the pod to proceed in the direction of movement of the main track by not actuating the corresponding motors.

10. The transportation system of claim 9, wherein the at least one roller is made of the dedicated motor itself, thereby reducing weight and space requirement.

11. The transportation system of claim 8, wherein the at least some of the plurality of rollers are moving axis rollers, wherein axis of rotation of the moving axis rollers is selectively rotatable to orient the moving axis rollers for achieving a required direction of movement of the pods.

* * * * *